United States Patent

Nye et al.

[15] 3,671,680

[45] June 20, 1972

[54] PRIVACY OF DICTATE STATIONS USING A RECORDER AND SELECTION OF RECORDERS BY DICTATE STATIONS WHILE MAINTAINING PRIVACY

[72] Inventors: William M. Nye, Bellevue; Stanley W. Jones, Seattle, both of Wash.

[73] Assignee: Lanier Electronic Laboratory, Inc., Atlanta, Ga.

[22] Filed: Aug. 11, 1969

[21] Appl. No.: 849,026

[52] U.S. Cl. .......... 179/100.1 DR, 179/6 E

[51] Int. Cl. .......... G11b 19/00, H04m 11/10

[58] Field of Search .......... 179/100.1 DR, 6 E, 6 C

[56] References Cited

UNITED STATES PATENTS

| | | | |
|---|---|---|---|
| 3,527,891 | 9/1970 | Johnston | 179/6 E |
| 2,755,339 | 7/1956 | Logan | 179/6 E |
| 1,551,319 | 8/1925 | Meyberg | 179/6 C |

*Primary Examiner*—Bernard Konick
*Assistant Examiner*—Raymond F. Cardillo, Jr.
*Attorney*—Jones & Thomas

[57] ABSTRACT

Persons are able to dictate promptly and privately using dictate stations which are connected to one or more recorders. Circuits, incorporating transistors and preferably physically located within a dictate station, assure privacy and/or select a recorder quickly. These additional control circuits for privacy and/or selection constantly monitor recording operations by sensing recorder voltage changes which indicate their immediate status of either being in use, i.e., not available, or not in use, i.e., available.

Therefore, as a person, for example, lifts a handset from a cradle of a dictate station, the status of a recorder is immediately and automatically determined. The privacy circuits of a dictate station with respect to any recorder already in use sense recorder voltages which fail to activate two transistors serving, sensing and latching functions. If, however, a recorder is not in use, these two transistors do serve a latching function and switch on a third transistor for entry into a particular recording circuit.

Where additional recorders may be available, additional selector sensing and latching transistors and their related circuits are utilized with the privacy transistors in immediately and automatically selecting one of the available recorders. As the transistor latching and switching on occurs in privately connecting a respective dictate station to a respective recorder, additional interrelated privacy and selection transistors and their circuits function together to prevent any interference with this connection thereby assuring privacy of the dictation as it is recorded.

15 Claims, 10 Drawing Figures

INVENTORS
WILLIAM M. NYE
STANLEY W. JONES
BY
Seed, Berry & Dowrey
ATTORNEYS

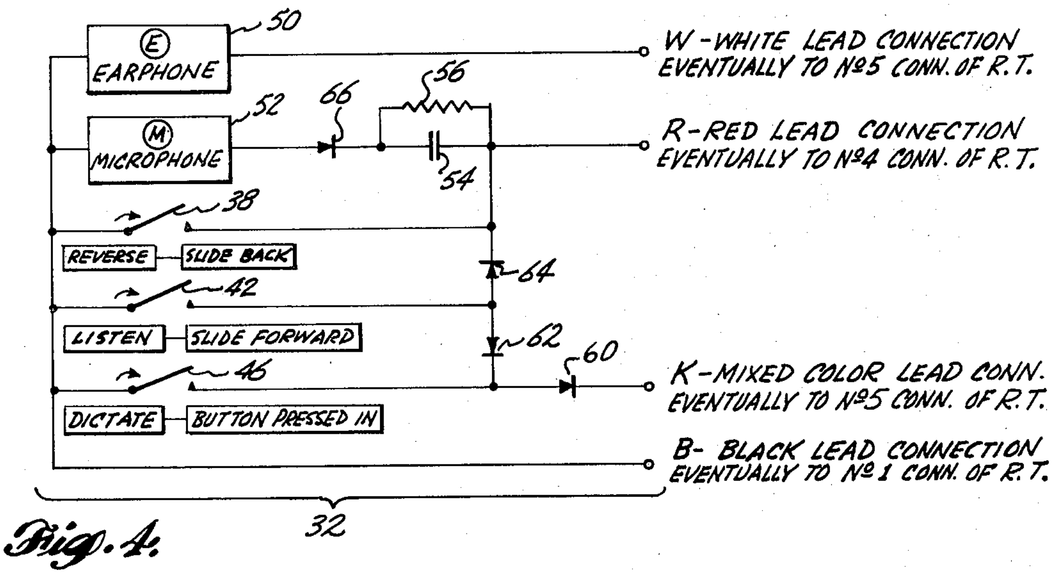
Fig. 4.
NOT IN USE STATUS OF R.T. TERMINALS
| | |
|---|---|
| 76 | -24 VOLTS |
| 74 | SLIGHTLY NEGATIVE |
| 72 | GROUND |
| 70 | GROUND OR COMMON |
Fig. 5.
IN USE STATUS OF R.T. TERMINALS
| | |
|---|---|
| 76 | -14 VOLTS |
| 74 | ABOUT -7 VOLTS |
| 72 | -24 VOLTS |
| 70 | GROUND OR COMMON |
Fig. 6.
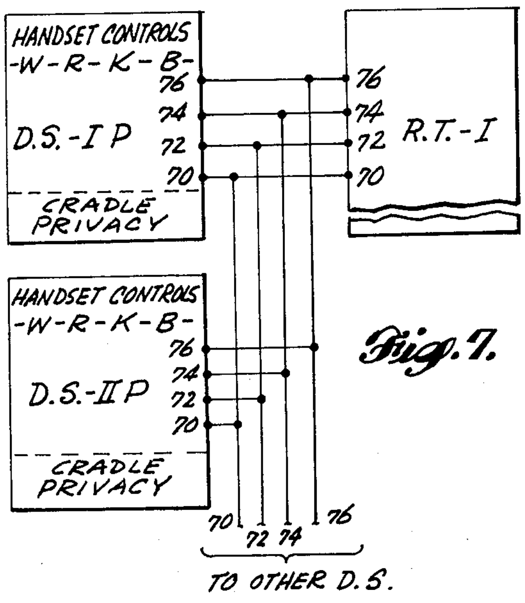
Fig. 7.
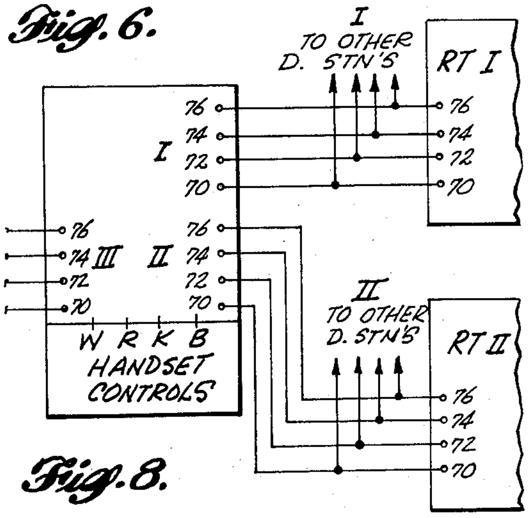
Fig. 8.
INVENTORS
WILLIAM M. NYE
STANLEY W. JONES.
BY Seed, Berry & Dowrey
ATTORNEYS INVENTORS
WILLIAM M. NYE
STANLEY W. JONES
BY
Seed, Berry & Dowrey
ATTORNEYS

INVENTORS
WILLIAM M. NYE
STANLEY W. JONES
BY
ATTORNEYS

PRIVACY OF DICTATE STATIONS USING A RECORDER AND SELECTION OF RECORDERS BY DICTATE STATIONS WHILE MAINTAINING PRIVACY

PATENT CONTAINING RELATED INFORMATION

Recording and Reproducing Systems, such as shown in William M. Nye's U.S. Pat. No. 2,988,604 and other systems, when enlarged by adding dictate stations and/or recorders establish a need for promptly acquiring and maintaining privacy and/or for promptly acquiring an available recorder.

BACKGROUND OF INVENTION

Recording and reproducing systems using magnetic recording tapes and belts are often enlarged by adding dictate stations and/or recorders. Such increases in overall capacity of enlarged systems creates a need to maintain privacy of dictation and promptly select an available recorder.

Attempts were made in the past to meet these needs and they primarily centered on utilizing electro mechanical devices. Generally they have not been fully automatic, not completely private, and not easily maintained.

This invention, in its various embodiments, provides each dictate station with related circuits incorporating transistors which as used in conjunction with similar circuits of other dictate stations to secure full privacy through fully automatic operation of easily maintained essentially non mechanical components. Moreover, full privacy is maintained as additional recorders are potentially connected into an overall recording and reproducing system and a prompt selection is made of an available recorder.

All related circuits establishing the automatic privacy and selection functions are applicable to any installation wherein specific like groupings of at least four terminals on each respective recorder, present, when a recorder is in use, one set of substantially like grouping of terminal voltages in recording circuits, and present, when a recorder is not in use, another set of substantially like grouping of different terminal voltages in these same recording circuits.

SUMMARY OF INVENTION

Multiple dictate stations of recording and reproducing systems which include one or more recorders are automatically and promptly connected to an available recorder and complete privacy is maintained. The related circuits used incorporate transistors that perform latching and switching functions preferably in conjunction with the dictate station, being essentially installed in the cradle below the handset and utilization of any dictate station involves monitoring existing voltage conditions of a recorder or recorders which indicate they are available or not available. During such monitoring, any dictate station will only automatically connect to an available recorder. Therefore no interruptions occur to destroy the privacy of dictation already in progress.

DRAWINGS OF PREFERRED EMBODIMENTS

FIG. 4 shows the components and circuits of a hand set of a dictate station which may be used in the system shown schematically in FIG. 1;

Figure 9:
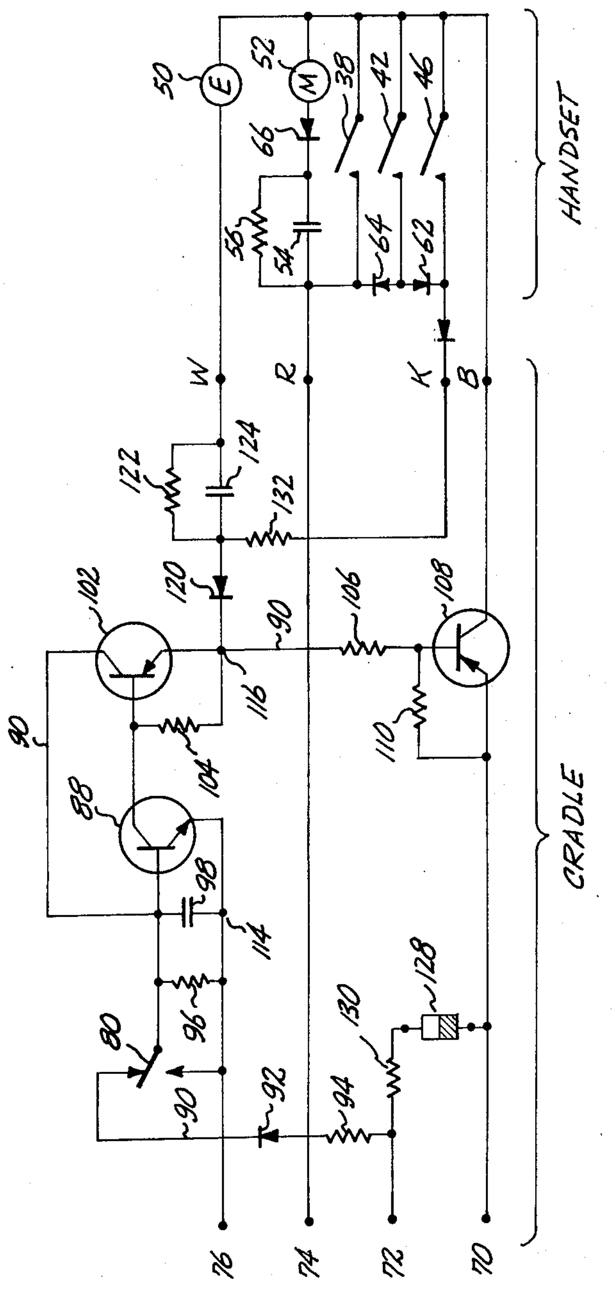
Figure 10:
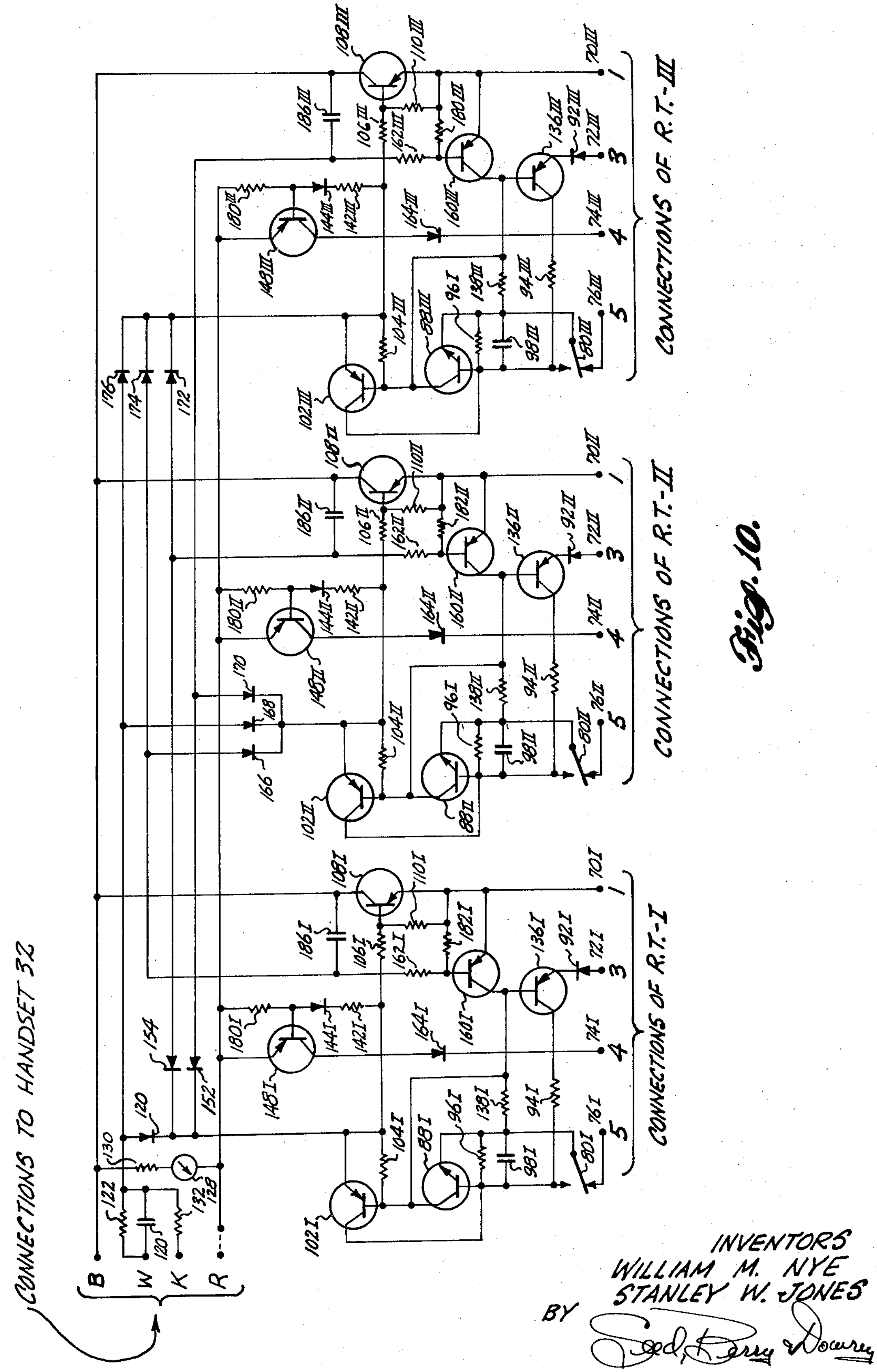

FIG. 5 indicates the available or not in use voltage status of a typical grouping of terminals of a recorder of a recording and transcribing system;

FIG. 6 is similar to FIG. 5, indicating, however, the change of voltage status of this typical grouping of terminals when a recorder is in use and not available;

FIG. 7 is a schematic partial electrical, non scale, view indicating how two dictate stations are connected to the selected four terminals of one recorder, and also indicating schematically the physical placement of the hand set circuits and privacy circuits in the dictate station location continuing the utilization of four leads;

FIG. 8 is a schematic view, similar to FIG. 7, indicating how dictate stations and recorders may be connected together using the selected four leads, and also indicating schematically the physical placement of the handset circuits, privacy circuits and selection circuits;

FIG. 9 is an electrical schematic view of the privacy circuits that are installed in a cradle of a dictating station and extends from four terminals to be connected to terminals of a recorder, to and beyond the original four terminals of the handset; and, FIG. 10 is an electrical schematic view of combined privacy and selection circuits that are installed in a cradle of a dictating station and extends from three sets of terminals to be connected to respective sets of terminals of three recorders, to and beyond the original four terminals of the handset.

DESCRIPTION OF PREFERRED EMBODIMENTS

Privacy of Dictation

Need for Private, Uninterrupted Dictation and Recording

Figure 1:
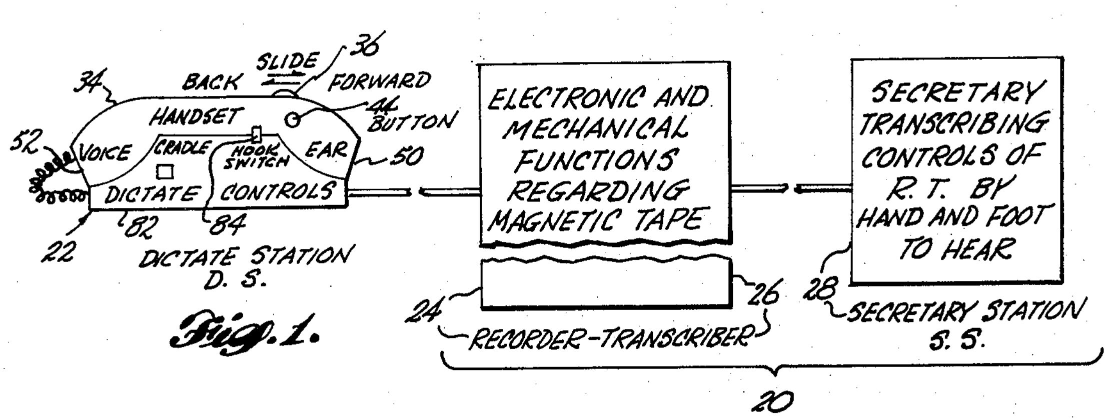
FIG. 1 is a schematic, non electrical, non scale, elevational view of one type of a recording and reproducing system incorporating the minimum essential three components: dictate station; recorder-transcriber; and secretary station.
Figure 2:
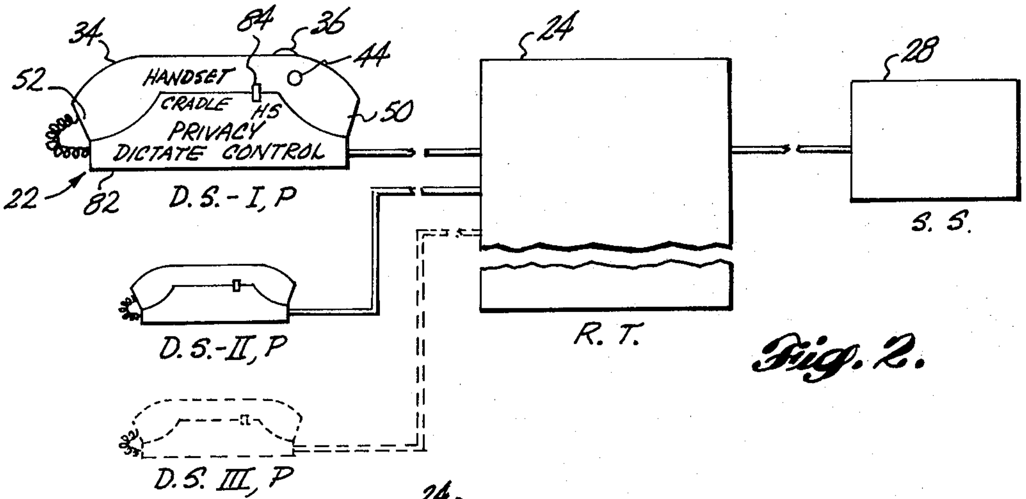
FIG. 2 is a similar schematic view to that shown in FIG. 1, indicating how a recording and reproducing system is expanded by adding more dictate stations, dotted lines indicating further expansions.

As a basic recording and transcribing system 20, having a dictate station 22, recorder 24, transcriber 26, and secretary station 28, such as shown in FIG. 1 and also in U.S. Pat. No. 2,988,604, is enlarged as illustrated in FIG. 2, there is a need for connecting a dictate station 22 to recorder 24 when it is available as soon as possible and to remain so connected without interruption, thereby obtaining and maintaining privacy. The components and circuits presented in FIG. 9, when in operation, insure such privacy.

Circuits and Components of Dictation Station

On the right side of FIG. 9, the basic handset circuits 32, first illustrated in FIG. 4, are presented and connecting terminals W.R.K. and B are shown again. These circuits are preferably physically contained in hand set 34 which, as noted in FIGS. 1, 2 and 3 has a sliding control 36 that in one position closes a tape return or reverse switch 38 and in its other position closes a listen switch 42. Also a button 44 is depressed on hand set 34 to close dictate switch 46. Handset 34 also includes earphone 50 and microphone input 52. Diodes 60,62,64,66 control direction of current flow.

Negative Voltage Selection in All Circuits

As noted in FIGS. 5 and 6, the recorder voltages are specified as negative voltages. Therefore, in understanding the control effected by these diodes, desired current flow is in the direction opposite to their arrow directions. This same selection of negative voltage requires also that current flow through emitters of transistors is in a direction opposite to their arrow directions.

Recorder Terminals or Leads Therefrom

On the left side of FIG. 9, are recorder terminals 70,72,74, 76 or connecting points to leads of a recorder 24. These terminals are also numbered in FIGS. 5,6,7 and 8. In FIG. 5, the voltages given occur when a recorder is turned on, not in use, and available to record dictation. In FIG. 6, the changed voltages given occur when a recorder is turned on, in use, and recording dictation.

"Hook" Micro Switch in Cradle and Responsive to Handset Movements

Also to the left side of FIG. 9, a "hook" micro switch 80 is shown in its position as headset 34 is lifted clear of cradle 82. As noted in FIGS. 1 and 2, each cradle 82 which receives a handset 34 has an upstanding button 84 which is depressed by handset 34 to open "hook" micro switch 80. When handset 34, however, is raised from cradle 82, spring biased button 84 moves to close "hook" micro switch 80.

Circuits and Components Added to Maintain Privacy

The remaining components and circuits in FIG. 9 between recording terminals 70,72,74,76 and handset terminals B.K.R.W., incorporating three transistors and an indicating means, comprise the circuit additions which create the basis for obtaining and maintaining privacy of dictation and recording. Remembering again the selected power source is at minus 24 volts, lifting of handset 34 frees button 84 moving hook micro switch 80 to the position shown in FIG. 9. If recorder 24 is not in use at this moment, recorder voltages are as given in FIG. 5.

Sensing or Scouting Transistor

Therefore sensing or scouting privacy transistor 88 conducts from its emitter, *e*, to its base, *b*. This occurs because the base of transistor 88 is connected respectively by a conductor 93, through hook micro switch 80, diode 92, resistor 94 to terminal 72 of recorder 24. At this initial start up time terminal 72 is at ground potential and terminal 76 is at minus 24 volts. At all times resistor 96 is used with transistor 88 to improve its temperature stability as it blocks leakage current from passing through transistor 88. Capacitor 98 slows up the off and on current changes to eliminate noise.

Coupling or Latching Transistor

With privacy sensing transistor 88 thus switched on and noting its collector, *c*, is connected to the base of transistor 102, negative voltage creating negative current flow from recorder terminal 76 then switches on coupling or latching privacy transistor 102. Resistor 104 is used with transistor 102 to improve its temperature stability as it blocks leakage current from passing through transistor 102.

Switching Transistor Operates for Entry to Recorder

The emitter of latching transistor 102 is connected through conductor 90, resistor 106 to the base of entry switching transistor 108. This base current continues on through the emitter of transistor 108 to recorder terminal 70 which, as noted in FIGS. 5 and 6, always remains at ground or common. This completes a starting resistive current flow path from recorder terminal 76 to recorder terminal 70, which permits transistor 108 to switch recorder 24 on. At this time when recorder 24 is on, as noted in FIG. 6, recorder terminal 76 drops to minus 14 volts, recorder terminal 74 is at about minus 7 volts, recorder terminal 72 is at minus 24 volts, and recorder terminal 70 remains at common or ground.

Completion of Latching of Privacy Transistors 88 and 102

With entry switching transistor 108 turned on, the emitter of privacy latching or coupling transistor 102 becomes more positive than the emitter of privacy sensing transistor 88. Therefore, remembering again the initial selection of a negative voltage designation at recorder terminal 76, with latching transistor 102 remaining switched on, this positive emitter potential also appears at its collector. As illustrated in FIG. 9 this collector of latching transistor 102 is always physically connected by a conductor 91 to the base of privacy sensing or scouting transistor 88. This coupling of these switched on sensing and latching transistors 88 and 102, respectively, is referred to as their latched conducting mode. They remain latched so long as a potential difference exists between the emitter of transistor 88 and the emitter of transistor 102. It is to be recalled that previously as the recorder turned on, the positive potential supplied to the base of transistor 88 from recorder terminal or lead 72 disappeared. This terminal voltage change necessitates this creating of a potential difference between the emitter of transistor 88 and the emitter of transistor 102 to keep privacy sensing transistor 88 turned on.

Temperature Stability of Entry Switching Transistor

Resistor 110 provides temperature stability of the entry switching transistor 108, blocking leakage current, in like manner as resistor 96 serves sensing transistor 88 and as resistor 104 serves latching transistor 102.

Multifunctions of Resistor 106 Located Adjacent Transistor 108

In line or series resistor 106, serves two functions. It helps in establishing a bias current for transistor 108 and it establishes the voltage seize level for recorder terminal 76.

Results of the Latching of Privacy Transistors 88 and 102

When sensing transistor 88 and latching transistor 102 become latched, circuit conductor locations 114 and 116 may be thought of as becoming, electrically one and the same, being indirectly in effect connected together. Also, then considering final switching of transistor 108 as equivalent of a direct three way connection, the reconstituted overall circuit resembles a circuit essentially used to directly connect handset circuits 32 to all recorder terminals.

Completed Overall Circuit for Operation of Handset Controls, etc.

Whether analyzed, as just indicated, or as directly shown in FIG. 9, with all three transistors switched on: recorder terminal 76 is connected to earphone 50 via transistors 88 and 102, diode 120, resistor 122, capacitor 124, and terminal, W, white lead of handset circuits 32; recorder terminal 70 is ground connected to terminal B, black lead of handset circuits 32; and recorder terminal 74 is connected directly to terminal R, red lead of handset circuits 32 which leads, without switching, to microphone 52; thereby completing the overall circuits. Upon such completion, operation of handset controls, such as the finger depression of button 44 assures recording of dictation, subsequent alternate direction finger movement of slide control 36 returns or reverses tape, not shown, and then thereafter listening is undertaken.

In regard to these operations undertaken as handset controls are moved, resistor 132 is selected to decrease voltage on recorder terminal 76 for control purposes. Capacitor 124 serves an audio coupling function. Resistor 122 aids in getting audio impulses through diode 120. Diode 120, in turn prevents any possible negative current flow in lead 74 from going all the way to turn on recorder entry switching transistor 108.

If a Recorder is Not Available

If a recorder 24 is in use by someone using another dictate station 22, when handset 34 is lifted from cradle 82, as noted in FIG. 6, recorder terminal 72 has negative 24 volts instead of ground, and recorder terminal 76 has a negative voltage less than 24 volts, being approximately minus 14 volts.

Therefore, with these voltage changes there is no adequate current flow or any current flow between recorder terminals 72 and 76 which could pass between the base and emitter of the privacy scouting or sensing transistor 88. Without, therefore, any current and any positive voltage to trigger transistor 88 on, no connection of this subsequently used dictate station 22 is made. Therefore, the dictation already in progress continues in privacy for no entry nor any attempted entry is ever possible.

If A Recorder is Turned Off

If a recorder 24 is turned off from its major power supply, not shown, so it will not be creating a power supply for its recording and transcribing system, then there will not be a negative voltage at recorder terminal 76 for it will be a ground potential, and recorder terminal 72, will also be at ground potential. There being no potential difference between these recorder terminals 76 and 72, no switching on of privacy sensing transistor 88, nor latching of privacy transistors 88 and 102 is possible. Therefore no connection to an off recorder 24 is possible.

Disconnect as Handset is Returned to Cradle

When handset 34 is placed on cradle 82, button 84 is depressed and its associated hook microswitch 80 opens, in turn opening the base circuit of sensing transistor 88 which previously connected its base to recorder terminal 72. Also upon opening of hook microswitch 80, the base of sensing transistor 88 is short circuited to its own emitter. Therefore, transistor 88 is switched off; transistor 102 without negative voltage or current at its base switches off; transistor 108 then, without negative voltage or current at its base switches off. Then when all three of these transistors 88, 102, 108 are switched off, except for recorder terminal or lead 74 which will then float, there will be no other connections between handset 34 of this dictate station and recorder 24.

Cradle Preferably contains Essential Components of Privacy Circuits

As viewed in FIG. 9, essentially all portions of this overall privacy circuit connecting similar designated terminals 70, 72 74 and 76, and handset terminals W,R,K, and B are physically installed within cradle 82. These privacy cradle installations and the control handset installations, thereby locate in a dictate station essentially all privacy components and circuits which are responsive to recorder voltage changes to obtain and to maintain secrecy during dictation.

Indicator Meter and Ready Tone

An indicator meter 128, together with resistor 130, is connected between recorder terminal 70 and 72. The indicator 128 is one-half brown and one-half white when a dictation station is ready for use and it is all white when it is in use. A light may be used in lieu of indicator meter 128, however, the meter has a preferred longer life of operation.

Ready tone equipment, not shown, is installed in the recording and reproducing system to create sounds in the earphone indicating operational conditions.

Selection of Recorder While Maintaining Privacy

Figure 3:
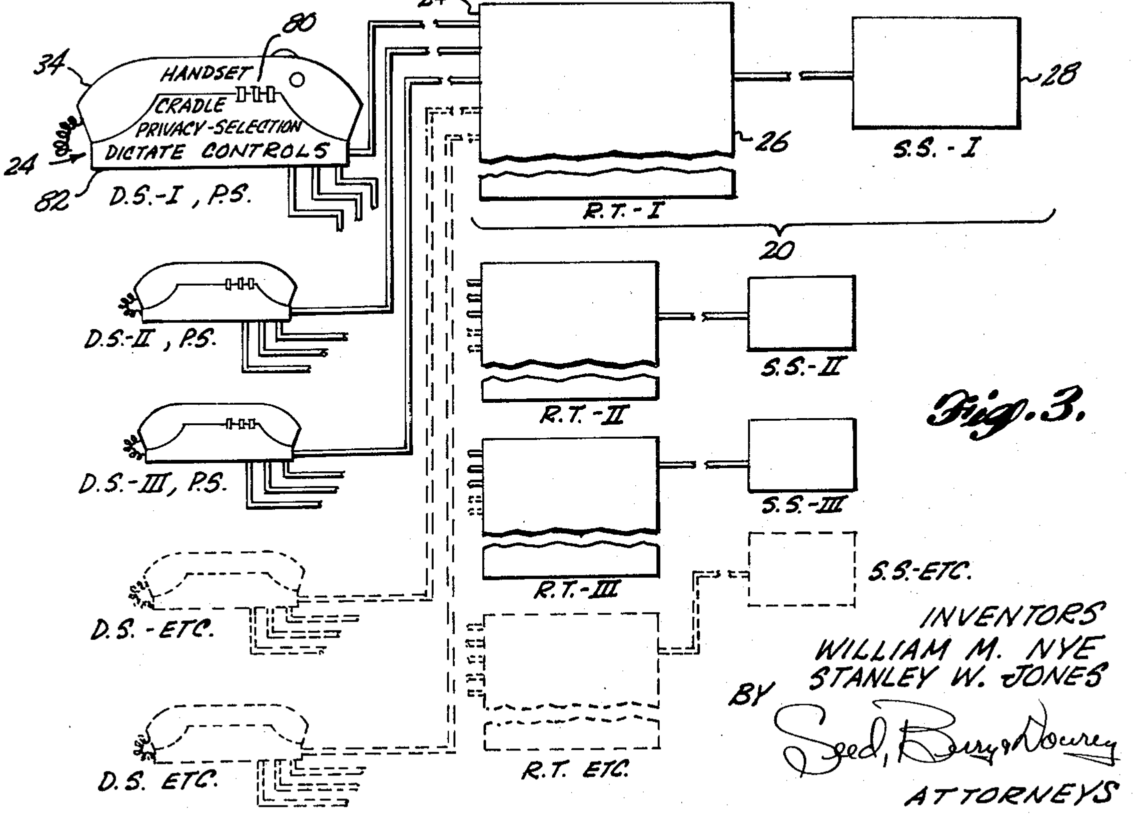
FIG. 3 is a similar schematic view to that shown in FIGS. 1 and 2, indicating how a recording and reproducing system is expanded by adding more dictate stations and recorders, dotted lines indicating further expansions.

As indicated in FIG. 3, expansion of a recording and transcribing system 20 may go beyond the expansion shown in FIG. 2. As such greater expansions are undertaken and dictate stations 22 are potentially ever ready to be fully connected to more than one recorder 24, the need for privacy is more acute. Moreover, the need for prompt automatic selection of an available recorder is greater.

The components and circuits illustrated in FIG. 10, incorporate similar components and circuits, as previously described, to obtain privacy, and new components and circuits are interrelated with them to obtain a prompt selection of an available recorder while maintaining privacy. Preferably these components and circuitry shown in FIG. 10 are again designed for incorporation partially into handset 34 and principally into cradle 82.

Throughout FIG. 10, components serving an identical function in a similar location in branch circuits are designated by like starting Arabic numerals which are immediately followed by Roman numerals, the latter all being the same in a particular branch I, II or III of privacy and selection circuits.

General Arrangement of Privacy and Selection Circuits

Relationship of Privacy and Selection Circuits

In the left side of FIG. 10, circuits, as shown in FIG. 9, are reoriented in a vertical direction. Handset leads or terminals R., K.,W., and B., in a different sequence, are shown. However, handset circuits 32 are not shown, because figure space is not available. If they were, circuits 32 would appear as before in FIG. 9.

Adjacent handset terminals R.,K.,W.,B., like components are again shown which serve a like function and the same numerals are used to identify them as follows: resistor 132 and indicator 128. In viewing FIG. 10 from left to right similarities continue in various circuits. Therefore the same numerals are used in identifying components of these combined privacy and selection circuits which continue to provide the privacy functions. In FIG. 9, only one recorder is available to be seized, if available. In contrast, as illustrated in FIG. 10, three recorders are available. Again there is the interrelation of sensing or scouting privacy transistor 88, latching or coupling privacy transistor 102, and recorder entry switching transistor 108, as entry of a dictate station is controlled to one recorder through respective terminals 70, 72,74,76.

Physical Arrangement of Components

FIG. 3 illustrates, schematically, a physical arrangement of components of a recording and transcribing system which incorporates privacy and selection components and circuits shown in FIG. 10. In FIG. 3, solid lines indicate how three dictate stations 22, and three recorders 24 are interconnected. Although a secretary's station 28 is indicated in FIG. 3 for a thorough initial understanding, its associated components and circuits are not shown in FIG. 10, because the privacy and selection circuits operate independently of both transcriber 26 and secretary's stations 28.

Possible Expansion of a Given System

Dotted lines of FIG. 3, suggest enlargement of privacy and selection components and circuits to include additional dictate stations 22 and/or recorders 24, if such expansion is predetermined to be necessary to meet particular dictation capacity requirements.

Multiple Triggering Microswitches in Dictate Stations

In FIG. 3, each cradle 82 has three hook microswitches 80 indicating that each dictate station 22 is potentially and alternately connectable to three recorders 24, whenever handset 34 is removed. Across FIG. 10, privacy and selection circuits related to three recorders are presented. In each group or branch of circuits one micro switch 80 is included. It is one of the three micro switches 80 shown in each cradle 82. In FIG. 10 therefore, terminals R., K., W., B., indicate circuit location of a dictate station 22, and respective microswitches 80 indicate the circuit locations of these three triggering cradle micro switches 80 in the branches of the privacy and selection circuits related to the three respective recorders 24.

Available and Unavailable Recorders-Voltage Changes

To correlate information presented in FIGS. 3,9 and 10, the three groups of recorder terminals are designated as: 76 I, 74, I, 72 I, 70 I; 76 II, 74 II, 72 II, 70 II; and 76 III, 74 III, 72 III, 70 III. Accordingly, respective components in circuits directed to privacy and selection of a particular recorder are referred to by these designations of I, II, and III. As previously given in FIGS. 5 and 6, recorders turned on but not in use maintain one set of voltages, and when in use they maintain another set of voltages.

Increased Circuits for Selecting An Available Recorder

Therefore, the added components and circuits shown in FIG. 10, are principally designed to continue privacy while any subsequently activated dictate station 22 promptly searches to seize an available recorder 24, which is maintaining voltages given in FIG. 5. The searching dictate station always avoids any interference with a non available recorder 24, that is maintaining voltages given in FIG. 6.

Selection-Of A Recorder When All are Available

Selection components to be described in referring to FIG. 10, do cooperate to avoid a lasting connection to all recorders when a handset 34 may be lifted from a cradle 82 so accurately that all hook micro switches 80 might instantaneously be effective. Yet, if all branches of the selection and privacy circuits were balanced upon completion of manufacture, hunting might rarely occur. An adjustment creating minor unbalance within and across these branches that are related to specific recorders prevents such a rare hunting circumstance. Thereafter, any expanded recording and transcribing system will seize only one recorder. Such single seizure operation is first described under circumstances when all recorders are available, being turned on but not in use.

Remember again the concept of a negative voltage power supply and assume a handset 34 has been lifted from a cradle 82 to clear three hook microswitches 80, as shown in FIG. 3. Refer to FIG. 10 and consider that dictate station terminals R., K., W., and B. are potentially active, and hook microswitches 80 in respective circuit branches I, II, and III are in their active positions connecting respective recorder power terminals or leads 76 I, 76 II, and 76 III. Also observe that the base of sensing privacy transistor 88 I, through resistor 94 I is connected to the collector of the secondary or selection latching transistor 136 I, and its base is connected through resistor 138 I and hook micro switch 80 to recorder 24 I power lead or terminal 76 I.

Recorder 24 I being available and turned on, the power negative voltage at terminal 76 I, starting at minus 24 volts, is apparent and sensed at the emitter of privacy sensing transistor 88 I. Also the starting recorder voltage is apparent at the collector and base of selection latching transistor 136 I, whose emitter is connected to recorder terminal 72 I. Recorder 24 I, being available and not in use, its terminal 72 I is connected fully to ground through internal resistors, not shown, in the recorder 24 I. This ground potential made available through terminal 72 I is effectively connected through diode 92 I, selection latching transistor 136 I, resistor 94 I, to the base of sensing transistor 88 I.

At this starting time, sensing transistor 88 I receives current and acquires positive voltage at its base and by conducting closes the supply of negative voltage and current from power terminal 76 I, of recorder 24 I to the base of privacy latching transistor 102 I, switching it on. As discussed before in describing privacy circuit operations, with latching privacy transistor 102 I in operation, its base to emitter current flows through resistor 106 I to the base of privacy recorder entry switching transistor 108 I and beyond to recorder terminal 70 I. With the resistive conductive path being so completed, originating at terminal 76 I and going to terminal 72 I, recorder 24 I is turned on.

Privacy Transistor Latching In privacy and Selection Circuits

As discussed in referring to FIG. 9, privacy latching occurring in those circuits, also occurs in these circuits of FIG. 10. When recorder 24 I, for example, is turned on, although the voltage at terminal 76 I dips to minus 14 volts, as shown in FIG. 6, the latching of privacy sensing transistor 88 I and privacy latching transistor 102 I is maintained. This happens because when transistor 102 I is supplied negative voltage to its base and switches on, the positive voltage when appearing at its collector, which is in turn connected to the base of privacy sensing transistor 88 I, assures there will be a voltage potential supplied to the base of sensing transistor 88 I, to replace the momentary initial voltage supplied through terminal 72 I. This transistor latching remains as long as a potential voltage difference exists between the emitter of transistor 88 I and the emitter of transistor 102 I.

Completions of Dictating Stations Circuits

With primary latching transistor 102 I on, negative voltage is supplied through resistor 142 I, diode 144 I to the base of microphone switching transistor 148 I. It is then turned on and the microphone circuit of headset circuitry 32, shown in FIG. 4, through terminal R, is connected to terminal 74 I of recorder 24 I. When a transistor 108 I turns on, it connects the common black terminal B of headset circuitry 32 to terminal 70 I of recorder 24 I. When transistor 102 I is latched, its emitter is an active portion of the audio listen circuit which includes diode 120 I, resistor 122, and capacitor 120 and the earphone 50 of headset 34. With transistors 88 I, 102 I, 108 I and 148 I all energized recorder 24 I is connected to terminals R.K.W. and B, and a handset connected thereto, the latter not being shown in FIG. 10.

As a Recorder is Seized, Others Are Not Seized

Without reference to other selection components, it is correctly assumed that recorders 24 II and 24 III would also be connected. However, there are additional selection components and their circuits which interrelate these privacy components and their circuits to present various selection possibilities between all recorders. However at all times only one recorder is seized by a particular dictate station.

Returning again to the status of recorder 24 I being seized by a dictate station 22, in Fig. 10 the emitter of transistor 102 I, through diodes 152, 154 is connected across through resistors 162 II, 162 III to the respective bases of remote selection sensing transistors 160 II, 160 III in their respective privacy and selection circuits which control connections to respective recorder terminals. These cross selection connections place a significant negative voltage the base of on transistors 160 II, 160 III thereby saturating them and thus in effect placing a solid ground at each base of selecting latching transistors 136 II, 136 III. Being so grounded they are switched off and they thereby prevent any appearance of a positive voltage at the respective bases of privacy sensing transistors 88 II, 88 III.

Further Protection Against Unwanted Operation of Privacy Latching Transistors

Because switching actions are fast when a handset 34 is lifted from a cradle 82, there is a possibility that privacy sensing transistors 88 II, 88 III, might be triggered on before selection latching transistors 136 II, 136 III were turned off. Therefore to prevent follow on latching of privacy transistors 102 II, 102 III and the simultaneous connections of recorders 24 II, 24 III, the collectors of remote selection sensing transistors 160 II, 160 III are respectively connected to the bases of privacy latching transistors 102 II, 102 III. These interconnections ground these bases and prevent a triggering and latching by privacy latching transistors 102 II, 102 III. This preventative ground potential remains as long as the handset 34 is in use and recorder 24 I is connected, thereby assuring the continuing supply of negative voltage via diodes 152, 154 to the bases of remote selection sensing transistors 160 II, 160 III.

First Branch Circuit Connecting A recorder Disables The Other Two Branch Circuits Continuing the assumption that all recorders are initially available, if recorder 24 II, or recorder 24 III, should be the first to turn on, the equivalent selection components in its branch of privacy and selection circuits would be effective to prevent the other two branches from being initially effective, and/or immediately interrupting them, to prevent them from interferring with the privacy established when the recorder was seized. The selection circuits of the first branch to make an active recorder connection is effective in the selection circuits of the other branches to disable them, so no additional privacy latching is obtained through this same initial raising of a particular handset 34.

No Connection is Made To A Recorder In Use

As discussed in conjunction with the privacy circuit of FIG. 9, and as observed in FIG. 10, a recorder in use changes the voltages at recorder terminals as set forth in FIGS. 5 and 6. Therefore in any branch of privacy and selection circuits, a recorder in use presents minus 14 volts at terminal 76 and minus 24 volts at terminal 72, so no latching by privacy transistors 88 and 102 can initially occur, and it is impossible to connect a dictate station 22 to a recorder 24 already connected to another dictate station.

A Recorder is Released But Filled and Turned On

A recorder no longer connected to a dictate station which is filled and still turned on will be triggered upon subsequent raising of a handset 34. However, it may be easily disconnected by depressing the respective hook micro switch 80 and automatically initiating a selection to another recorder which is available.

Prevention of Wrong Direction Current Flows and Reverse Biasing

Throughout FIG. 10, it will be observed that diodes are incorporated both in the branch circuits I, II, and III and in the selection interrelation or cross circuits. In the respective branch circuits, diodes 92 I, 164 I, and 144 I and their counterparts, 92 II, 92 III, 164 II, 164 III and 144 II, 144 III, all serve as isolation diodes to prevent current flow in the wrong direction and to prevent reverse biasing of various transistors. The other diodes 120, 152, 154, 166, 168, 170, 172, 174, 176, located throughout the selection cross or interrelation circuits, also are positioned to prevent wrong direction current flow and to prevent biasing of various transistors.

Temperature Control of Transistor Operations

As noted in FIG. 9 and again in FIG. 10, a resistor is associated with each base of all transistors to stabilize its operation during temperature changes and blocking leakage currents. These resistors are: 96 I, II, III; 104 I,II, III; 110, I,II, III; 136, I, II, III; 138, I, II, III; 180, I, II, III; and 182, I, II and III.

Noise Control and/or Elimination

As noted in FIG. 9 and again in FIG. 10, a capacitor is associated with each privacy sensing transistor. The capacitors 98 I, II, and III help in controlling and/or eliminating noise by in effect slowing up the turning on and off of the sensing transistor.

Control of Cross Circuit Momentary Pulses

As noted in FIG. 10, each branch of privacy and selection circuits has a capacitor ahead of the remote selector sensing transistor to serve as a buffer in preventing momentary pulses from releasing these transistors 160 I, II, and III. These buffer capacitors are 186, I, II, and III.

Operation of the Handset, and Manual Selection of Recorder

Handset 34 is held and its controls moved in the same manner as was described in conjunction with privacy circuits. The microphone circuit is shorted to ground for reversing. Lead 76 is lowered toward ground with resistor 132 for dictation. Both microphone circuit 74 and terminal 76 are grounded and lowered toward ground respectively for listening. Any one recorder of several connected to a dictate handset may be selected manually, if available, upon conditions of FIG. 5, by depressing "hook" switches 80 of recorders not desired.

Disconnection

When handset 34 is replaced on cradle 82, all hook microswitches 80 I, II and III open, disconnecting leads 76 I, II and III and connecting or switching the bases of privacy sensing transistors 88 I, II and III to their respective emitters, thereby placing them in their off mode. As a result base currents of all other transistors are removed effecting an overall complete disconnect. With the microswitches in their disconnect position shorting these bases to emitters, there is no further current flow through them, and no transient pulses from other circuits can trigger, accidently or otherwise, any of these privacy and selection branches of circuits.

Indicating Meter Placement

Indicators for revealing circuit operations and other related matters by visual and/or audio signals presented at the dictate station are placed in circuits to avoid current drains. For example in FIG. 1, indicating meter 128 is connected so it is in the microphone ground loop of the dictate station 22 in series with voltage limiting resistor 130. This placement of meter 128 eliminates all current drain in 72 leads. Meter 128 indicates only when a recorder 24 has been seized.

Some Preferred Specifications of Components

Several resistors are ¼ W, 10 percent. All diodes are silicon, 1 amp., 200 p.i.v. Some capacitors are 1 m.f.d., 3 volts, such as 98 I, II and III. Other capacitors are 6 m.f.d. 25 volts, such as 120, 186 I, II and III. All transistors are T.1. silicon 2 NS, being either PNP or NPN.

SUMMARY OF IMPORTANT ADVANTAGES

Privacy components and circuits utilizing interrelated functioning transistors operate quickly to determine for a dictate station the status of recorder voltages indicating their use and/or non use. An available recorder, presenting a definite set of voltages, is promptly connected to the dictate station by and through the privacy components and circuits. Other than a handset microswitch serving an electro mechanical triggering function, all the triggering is undertaken by electronic triggering of privacy sensing, latching, and switching transistors. Therefore the privacy components and circuits are reliably operated for long periods of time without maintenance or repair. Moreover, they are sufficiently small in size to be installed in the cradle below the handset of each dictate station.

Where several dictate stations and several recorders are included in an expanded recording and transcribing system, these privacy components and circuits are conveniently combined with selection components and circuits. The privacy portions search for and latch into an available recorder, and the selection portions terminate the search once the latching occurs and as necessary interrupt any simultaneous or nearly so latching to another recorder. The additional selection components and circuits utilize interrelated functioning transistors which operate quickly to sense the remote latching of another recorder and then latch out and switch off any connection to their associated recorder. These combined selection components and circuits are compactly added to the privacy components and circuits, so the resulting overall privacy and selection components and circuits are installed in the cradle below the handset of each dictate station.

At all times, each dictate station is ready to be quickly connected to an available recorder and prevented from being connected to others. Therefore various dictate stations potentially coupled to a respective recorder or to a group of recorders, once placed in use are quickly and privately connected, without causing any interruption of any dictation already in progress.

We claim:

1. Dictate station apparatus for connection in circuit between a recorder and a dictate control apparatus, comprising:

privacy sensing means selectively connected in circuit with the recorder to assume a certain operative condition in response to a recorder signal indicating availability for recording;

latching means connected in circuit with said privacy sensing means and operative in response to the occurrence of said certain operative condition to maintain said privacy sensing means in said certain operative condition in the absence of the recorder availability signal; and switching means connected in circuit between the recorder and the dictate control apparatus, said switching means being operatively connected with said latching means to establish an operative circuit between the recorder and the dictate control apparatus in response to said operation of said latching means.

2. Dictate station apparatus as in claim 1, for connection in circuit between a dictate control apparatus and a plurality of recorders, comprising:

separate privacy sensing means selectively connected in circuit with each of said plurality of recorders and operative to assume said certain operative condition in response to signals from the respective recorders indicating availability for recording;

separate latching means connected in circuit with each of said separate privacy sensing means, each of said latching means operative in response to the occurrence of said certain operative condition in the respective one of said privacy sensing means to maintain said respective privacy sensing means in said operative condition in the absence of the recorder availability signal;

separate switching means connected in circuit between each of said plurality of recorders and the dictate control apparatus, each of said switching means being operatively connected with the corresponding latching means to establish an operative circuit between the corresponding one of said plural recorders and the dictate control apparatus in response to said operative of the corresponding latching means; and interconnective circuit means connected in circuit with each of said latching means and operative in response to said operation of one of said privacy sensing means and said operation of the corresponding one of said latching means to render the remaining privacy sensing means incapable of assuming said certain operative condition.

3. Apparatus as in claim 2, further comprising:

separate remote selection sensing means connected in circuit with each of said privacy sensing means and also in circuit with said interconnective circuit means, each of said remote selection sensing means being operative in response to a certain signal on said interconnective circuit means to render said corresponding privacy means incapable of assuming said certain operative condition.

4. In an expanded recording and reproducing system including multiple dictate stations and multiple recorders, privacy and selection components and circuits incorporated into overall resulting circuits having circuit branches for each recorder and interrelated circuits between such circuit branches;

such essential privacy components in each branch comprising a privacy sensing transistor connected between leads interconnecting a recorder and a dictate station, said privacy sensing transistor operative to switch on only in response to a dictate station being activated and voltages being present at the branch recorder indicating availability for recording;

a privacy latching transistor connected in circuit with the privacy sensing transistor to switch on only when the privacy sensing transistor switches on and thereafter operative to supply biasing voltage to the privacy sensing transistor, to thereby latch the privacy sensing transistor on before the voltage of the recorder changes in response to recorder seizure;

a recorder switching transistor turned on in response to the privacy latching transistor switching on, whereby said recorder switching transistor establishes circuit in the leads interconnecting the dictate station to the branch recorder terminals; and, such essential selection components in each branch comprising a remote selection sensing transistor and a remote selection latching transistor, said remote selection latching transistor operative only when a recorder is available to be seized through operation of said privacy components and circuits arranged for connection to the recorder directly connected to this particular branch of the system and when the dictate station activated to seek a recorder has not already seized another recorder; said remote selection sensing transistor operative in response to a signal received on the interrelated circuit from the branch interconnected with the already-seized recorder to keep the remote selection sensing transistor from turning on.

5. In an expanded recording and reproducing system, as claimed in claim 4, comprising, in addition, a microphone switching transistor in each recorder branch operative to be switched on when privacy sensing and latching transistors are latched for switching on the recorder switching transistor.

6. Dictate station apparatus for connection in circuit between a recorder and a dictate control apparatus, comprising:

privacy sensing transistor means selectively connected in circuit with the recorder to assume a certain operative condition in response to a recorder signal indicating availability for recording;

latching transistor means connected in circuit with said privacy sensing transistor means and operative in response to the occurrence of said certain operative condition to maintain said privacy sensing transistor means in said certain operative condition in the absence of said recorder availability signal; and switching transistor means connected in circuit between the recorder and the dictate control apparatus, said switching transistor means being operatively connected with said latching transistor means to establish an operative circuit between the recorder and the dictate control apparatus in response to said operation of said latching transistor means.

7. Privacy components and circuits, as claimed in claim 6, wherein resistors are connected between the bases and emitters of all said transistor means for their effective temperature stabilization.

8. Apparatus as in claim 6, wherein an indicating means is connected in circuit with the recorder to visually present operational stages of recording sequences.

9. Apparatus as in claim 6, further comprising:

switch means connected in circuit between the recorder and said privacy sensing transistor means, said switch means being selectively operable to a first position to establish said selective connection of said privacy sensing transistor means and to a second position to establish a circuit condition preventing said privacy sensing transistor means from maintaining said certain operative condition.

10. Apparatus as in claim 9, wherein:

said privacy sensing transistor means when selectively connected in circuit with the recorder to receive a recorder busy signal indicating unavailability for recording, being operatively connected to refrain from assuming said certain operative condition, whereby said switching transistor means prevents establishment of an operative circuit between the recorder and the dictate control apparatus.

11. Apparatus as in claim 10, wherein:

said dictate control apparatus includes audio communication means for selective communication with the recorder and recorder control means for controlling modes of recorder operation;

said switching transistor means is operatively connected in circuit between the recorder and the dictate control apparatus to establish said operative circuit for said audio communication means and said recorder control means in response to said operation of said latching transistor means; and said switching transistor means is additionally operative to terminate said operative circuit for said audio communication means and said recorder control means in the absence of said operation of said latching transistor means.

12. Dictate station apparatus as in claim 6, for connection in circuit between a plurality of recorders and a dictate control apparatus, comprising:

separate branch circuit means interconnecting the dictate station with each of the recorders;

said dictate station including a recorder selection branch corresponding to each of the recorders, with each of said recorder selection branches interconnected with a particular one of the recorders by a corresponding one of said branch circuits;

each of said recorder selection branches including corresponding privacy sensing transistor means, latching transistor means, and switching transistor means operatively disposed to selectively establish an operative circuit between the dictate control apparatus and the recorder correspondingly interconnected with each such recorder selection branch;

remote selection sensing means in circuit with a particular recorder selection branch;

interrelating circuit means operatively connected between said particular recorder selection branch and at least one other recorder selection branch to receive a signal indicating that operative circuit has been established through said other recorder selection branch between the dictate control apparatus and the recorder interconnected with said other recorder selection branch; and said remote selection sensing means being operative in response to the presence of said signal on said interrelating circuit means to prevent said particular recorder selection branch from establishing operative circuit between the dictate control apparatus and the recorder interconnected with said particular recorder selection branch.

13. Apparatus as in claim 12, comprising, a dictate control station audio circuit switching transistor means in each recorder selection branch to be switched on when the privacy sensing and latching transistor means of a particular branch are latched for switching on the corresponding switching transistor means.

14. Apparatus as in claim 12, wherein resistors are connected between bases and emitters of all said transistor means for their effective temperature stabilization.

15. Apparatus as in claim 12, wherein an indicating means is connected in circuit with the dictate station to visually present operational stages of recording sequences.

* * * * *